April 6, 1926.

L. C. JOSEPHS, JR 1,579,324

CONTROLLING DEVICE FOR THE THROTTLE VALVES OF INTERNAL COMBUSTION ENGINES

Filed July 14, 1923

Inventor
Lyman C. Josephs, Jr.
By his Attorneys

Patented Apr. 6, 1926.

1,579,324

UNITED STATES PATENT OFFICE.

LYMAN C. JOSEPHS, JR., OF ALLENTOWN, PENNSYLVANIA, ASSIGNOR TO INTERNATIONAL MOTOR COMPANY, OF NEW YORK, N. Y., A CORPORATION OF DELAWARE.

CONTROLLING DEVICE FOR THE THROTTLE VALVES OF INTERNAL-COMBUSTION ENGINES.

Application filed July 14, 1923. Serial No. 651,695.

*To all whom it may concern:*

Be it known that I, LYMAN C. JOSEPHS, Jr., a citizen of the United States, residing in the city of Allentown, in the State of Pennsylvania, have invented certain new and useful Improvements in Controlling Devices for the Throttle Valves of Internal-Combustion Engines, of which the following is a specification, reference being had to the accompanying drawings, forming a part hereof.

This invention relates to devices for operating the butterfly valve of a power motor by means which are not manual although initiation of the operation thereof is manual. It has for its principal object to provide devices which are invariable in their operation, sensitive to intermediate adjustments of the driven parts as required, and include a friction drive for the protection of the parts in extreme positions of travel. In accordance with the invention an electric motor or other available source of power is provided to actuate the throttle valve at a speed which is so reduced as to give the required sensitiveness in control. In the driving mechanism between the prime mover and the throttle valve there is interposed a friction drive which affords slippage in extreme positions of travel of the throttle valve thereby protecting the parts against breakage regardless of the care or skill of the operator. In the preferred embodiment it is proposed to connect the throttle-valve operatively with a spring-pressed friction plate which is engaged in driving relation with a plate fixed on a shaft driven at the desired speed by the prime mover. In extreme positions of travel when the throttle-valve may be moved no further the friction plate with which it is connected being pressed yieldingly into frictional engagement with a disk on the driving shaft is permitted to rest regardless of continued rotation of the said shaft.

It will be evident as the description proceeds that the devices are applicable for association with different units of an internal combustion engine to be controlled but for convenience there has been shown in the accompanying drawings an embodiment wherein a butterfly valve of conventional form is actuated. In the drawings.

Figure 1:
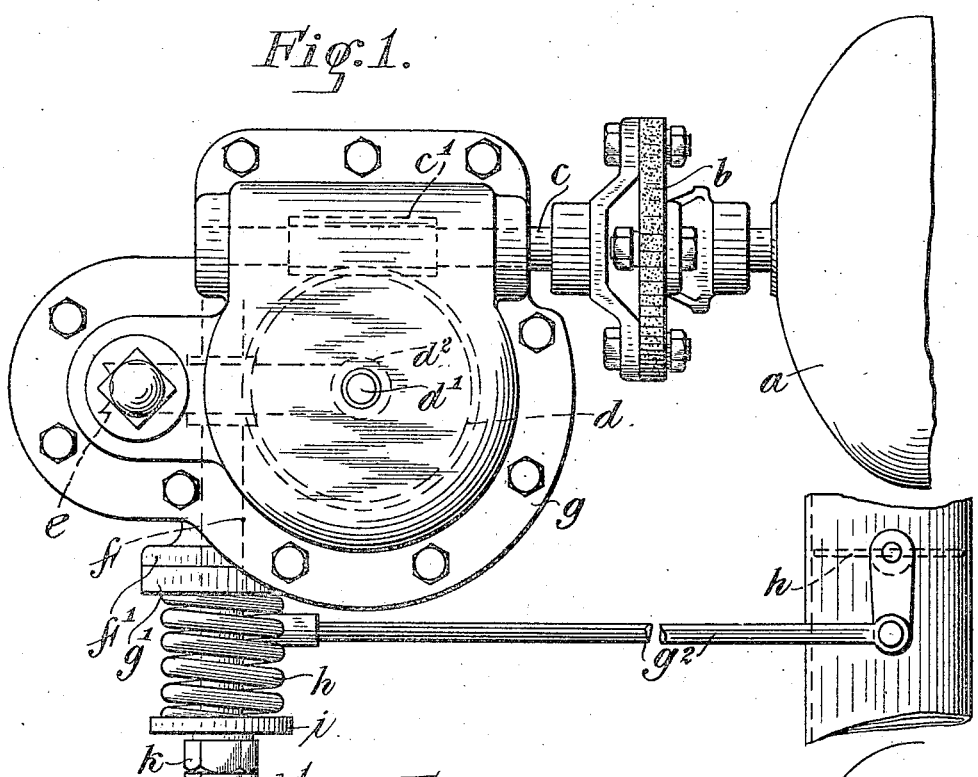
Figure 1 is a view in plan of the improved control devices connected to a throttle valve and driven by an electic motor.
Figure 2:
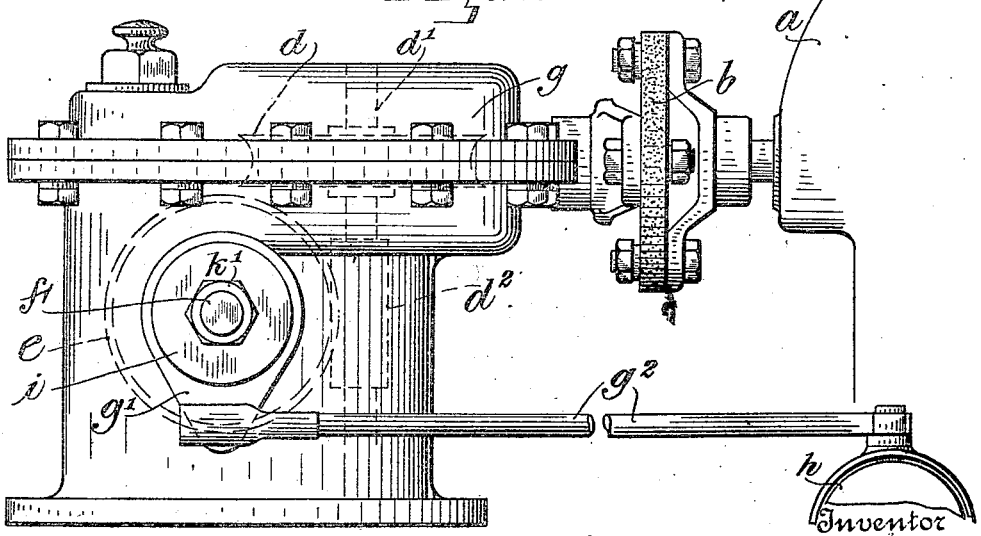
Figure 2 is a view in end elevation of the parts shown in Figure 1.

The actuating motor which, in practice, may conveniently be a small electric motor $a$ drives through a universal joint $b$, if necessary, a worm shaft $c$, through which reduction and speed may conveniently be secured so that the driven shaft through which the power is ultimately delivered rotates so slowly as to give the desired sensitiveness in control. Such reduction gearing in the illustrated case includes a worm $c'$ meshed with a worm wheel $d$ on the shaft $d'$ on which is a second worm $d^2$ in driving engagement with a second worm wheel $e$ on the driven shaft $f$. Other reduction gearing than that illustrated may obviously be employed. The parts described may be enclosed in a suitable housing $g$. On the driven shaft $f$ is secured a driving plate $f'$ against which is pressed yieldingly a friction plate $g'$ backed up by a spring $h$, the other end of which seats on a washer $i$ carried loosely on the shaft $f$. The washer $i$ is maintained in desired relation to the spring $h$ and the tension of the spring is adjusted by means of an adjusting nut $k$ and lock-nut $k'$ threaded on the end of the driven shaft $f$. To the friction plate $g'$ is pivotally connected a link $g^2$ which may be operatively engaged with a throttle valve $h$ of a motor to be controlled.

The operation of the improved devices will be clear from the aforegoing description. The prime mover $a$ drives a shaft $f$ at a comparatively slow speed sufficient to enable a sensitive control to be obtained. The spring $h$ presses the friction plate $g'$ against the face of the driving plate $f'$ with sufficient pressure normally to cause actuation of the throttle valve in a direction depending on the direction of rotation of the actuating motor $a$. A skillful operator by stopping the motor $a$ may obviously arrest movement of the throttle valve in any desired position. If the motor $a$ is not stopped it is evident that the throttle valve will be moved to one or the other of its extreme positions of travel. In such a position it is evident that the plate $g'$ may be moved no further. Continued rotation of the driving plate $f'$ will result in slippage between the two plates against the friction induced by the spring $h$ but no injury to the parts will ensue. The improved device is characterized by simplicity, certainty of operation and complete protection to the mechanism.

It is to be understood that the character of the driving motor $a$ may be changed; that any suitable reduction gearing may be interposed between it and the controlled unit; and that the throttle valve may take other forms.

What I claim is:

1. Controlling devices for the throttle valve of an internal combustion engine comprising a propelling motor, a shaft driven thereby, a friction plate connected to the throttle valve and a friction plate carried by said shaft and engaging said first named plate operatively to deliver power to the throttle valve.

2. Controlling devices for the throttle valve of an internal combustion engine including a propelling motor, a shaft driven thereby, a friction plate secured to the shaft, a friction plate mounted loosely on the shaft, a spring to hold said plates yieldingly in driving engagement, and means to connect the second named plate with the throttle valve.

3. In combination, an electric motor, a shaft driven thereby, reduction gearing interposed between the shaft and the motor, a friction plate secured to the shaft, a second plate mounted loosely on the shaft, a spring to press the second named plate yieldingly in driving engagement with the first named plate, means to adjust the tension of the spring, and means to connect the second named plate with the throttle valve of an internal combustion engine.

This specification signed this ninth day of July A. D. 1923.

LYMAN C. JOSEPHS, Jr.